US012540051B2

(12) United States Patent
Hsu

(10) Patent No.: US 12,540,051 B2
(45) Date of Patent: Feb. 3, 2026

(54) PASSENGER INTERFACE FOR SHUTTLE ELEVATOR SYSTEM

(71) Applicant: Otis Elevator Company, Farmington, CT (US)

(72) Inventor: Arthur Hsu, South Glastonbury, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 1473 days.

(21) Appl. No.: 17/101,353

(22) Filed: Nov. 23, 2020

(65) Prior Publication Data

US 2021/0155452 A1 May 27, 2021

Related U.S. Application Data

(60) Provisional application No. 62/940,385, filed on Nov. 26, 2019.

(51) Int. Cl.
*B66B 3/00* (2006.01)
*B66B 5/00* (2006.01)

(52) U.S. Cl.
CPC ............ *B66B 3/006* (2013.01); *B66B 5/0012* (2013.01); *B66B 2201/405* (2013.01)

(58) Field of Classification Search
CPC .. B66B 3/006; B66B 5/0012; B66B 2201/405
USPC .......................................................... 187/392
See application file for complete search history.

(56) References Cited

U.S. PATENT DOCUMENTS

| | | | |
|---|---|---|---|
| 9,561,932 B2 * | 2/2017 | Salmikuukka | B66B 3/006 |
| 2005/0098391 A1 | 5/2005 | Rintala et al. | |
| 2011/0132699 A1 | 6/2011 | Tokura et al. | |
| 2012/0125719 A1 | 5/2012 | Sundholm et al. | |
| 2017/0260023 A1 | 9/2017 | Zhang | |

FOREIGN PATENT DOCUMENTS

| | | |
|---|---|---|
| CN | 1646406 A | 7/2005 |
| CN | 102159481 A | 8/2011 |
| CN | 105324322 A | 2/2016 |
| CN | 106915670 A | 7/2017 |
| CN | 107176511 A | 9/2017 |
| CN | 107683250 A | 2/2018 |
| CN | 109484932 A | 3/2019 |

(Continued)

OTHER PUBLICATIONS

Hatori et al. (WO 2014171296 A) Elevator System (Year: 2014).*

(Continued)

*Primary Examiner* — Jorge L Carrasquillo
(74) *Attorney, Agent, or Firm* — CANTOR COLBURN LLP

(57) ABSTRACT

A shuttle elevator loading system includes a plurality of shuttle elevators configured to service a building lobby. At least one sensor is configured to detect at least one passenger and at least one display unit is located at a display zone of the lobby. An elevator system controller is in signal communication with the at least one sensor and the at least one display unit. The elevator system controller determines a number of allocated passengers corresponding to each shuttle elevator and generates assignment information that directs a non-allocated passenger to an available shuttle elevator.

16 Claims, 4 Drawing Sheets

FIG. 3

(56) References Cited

FOREIGN PATENT DOCUMENTS

| | | | |
|---|---|---|---|
| JP | 2016064885 | A | 4/2016 |
| JP | 2018002351 | A | 1/2018 |
| JP | 2018030655 | A | 3/2018 |
| WO | 2014171296 | A1 | 10/2014 |

OTHER PUBLICATIONS

Simcik et al. (CN 108975109 A) for the Elevator Distributed to the Mobile Device User (Year: 2018).*
Hattori (JP 2014177341 A) Elevator System and Control Device for an Elevator (Year: 2014).*
Yoshikawa et al. (JP 2018030655 A) Elevator System (Year: 2018).*
Search Report issued in European Patent Application No. 20210136.6; Application Filing Date Nov. 26, 2020; Date of Mailing May 14, 2021 (7 pages).
Office Action issued for Chinese Application No. 202011349670.6; Application Filing Date Nov. 26, 2020; Date of Mailing Mar. 8, 2022 (12 pages).

* cited by examiner

PASSENGER INTERFACE FOR SHUTTLE ELEVATOR SYSTEM

DOMESTIC PRIORITY

This application claims priority to U.S. Provisional Application Ser. No. 62/940,385, filed Nov. 26, 2019, the contents of which are hereby incorporated by reference in its entirety.

BACKGROUND

The embodiments herein relate to the field of conveyance systems, and more particularly, to processing conveyance system service requests.

Modern development in high-rise building and skyscraper architecture has led to the design and construction of skyscrapers classified as "supertall" buildings that exceed about 985 feet (about. 300 meters) or even "megatall" buildings, which can exceed 19,970 feet (about 600 meters). However, implementing conventional elevator systems in supertall or megatall buildings can present issues. For example, travelers aiming to reach a specific higher floor may in a supertall building conceivably must stop at a very large number of other floors to let other passengers off and on before reaching their destination. This increases travel time for travelers aiming to reaching the highest floors, and indirectly requires many more elevator shafts to still allow acceptable travel times, thereby reducing effective floor space on each floor for all levels.

One solution to reduce elevator traveling time in supertall or megatall buildings has been the design and implementation of "sky lobbies", which are sometimes referred to as "shared lobbies." A sky lobby is an intermediate interchange floor in the building where people can transfer from a shuttle elevator (sometimes referred to as an shuttle lift or express elevator) to one or more conventional elevators that serve a particular segment of the building. Unlike conventional elevators, a shuttle elevator travels directly between the sky lobby and another floor (e.g., from the sky lobby to the ground floor or from the sky lobby to the roof). Once at the sky lobby, travelers can transfer to the conventional elevator system which stops at every floor included in the segmented portion of the building.

SUMMARY

According to an embodiment, a shuttle elevator loading system includes a plurality of shuttle elevators configured to service a building lobby. At least one sensor is configured to detect at least one passenger and at least one display unit is located at a display zone of the lobby. An elevator system controller is in signal communication with the at least one sensor and the at least one display unit. The elevator system controller determines a number of allocated passengers corresponding to each shuttle elevator and generates assignment information that directs a non-allocated passenger to an available shuttle elevator.

In addition to one or more of the features described herein, or as an alternative, the elevator system controller dynamically controls the at least one display unit based on the assignment information.

In addition to one or more of the features described herein, or as an alternative, the elevator controller controls the elevator shuttle loading system to reduce passenger crowding based on the number of allocated passengers corresponding to at least one of the shuttle elevators.

In addition to one or more of the features described herein, or as an alternative the at least one display unit includes an arrival display unit located in an arrival display zone that precedes the plurality of shuttle elevators.

In addition to one or more of the features described herein, or as an alternative, the elevator system controller controls the arrival display unit to display assignment information that directs a non-allocated passenger to an available shuttle elevator.

In addition to one or more of the features described herein, or as an alternative, the display assignment information is dynamically changed as an availability of the shuttle elevators changes.

In addition to one or more of the features described herein, or as an alternative, the elevator system controller dynamically adjusts the number of allocated passengers corresponding to at least one shuttle elevator based at least in part on an output of the at least one sensor following an initial allocation assigned to the at least one passenger.

In addition to one or more of the features described herein, or as an alternative, the elevator system controller is configured to control boarding of the at least one passenger based on a number of allocated passenger corresponding to a given shuttle elevator.

In addition to one or more of the features described herein, or as an alternative, further embodiments may include wherein the at least one sensor comprises a sensor configured to monitor each individual elevator queue and to detect one or more persons in the vicinity of one or more of the elevator queues.

In addition to one or more of the features described herein, or as an alternative, further embodiments may include wherein the at least one sensor includes an elevator queue sensor installed at an individual elevator queue.

In addition to one or more of the features described herein, or as an alternative, further embodiments may include wherein the elevator queue sensor is configured to monitor the individual elevator queue and to detect one or more persons in the vicinity of the individual elevator queue.

According to another embodiment, a shuttle elevator loading system comprises a plurality of shuttle elevators configured to service a building lobby. At least one sensor is configured to detect at least one passenger and at least one display unit is located at a display zone of the lobby. An elevator system controller is in signal communication with the at least one sensor and the at least one display unit. The elevator system controller is configured to determine a number of allocated passengers corresponding to each shuttle elevator, and to generate assignment information that directs a non-allocated passenger to an available shuttle elevator.

Technical effects of embodiments of the present disclosure include the ability to process a service request related to a conveyance system and determine whether to initiate a service call based on one or both of system status and one or more inputs.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

As described above, shuttle elevators system are different from conventional elevator systems in that the destination of a given shuttle elevator is already known rather requiring a passenger to input a destination floor. However, shuttle elevator systems typically include a group of several individual shuttle elevators capable of servicing one or more passengers. Known boarding methods allow passengers to simply choose any shuttle elevator within the group without any guidance or direction. Further, the shuttle elevator door remains opens or is closed based on a fixed timer regardless as to the number of passengers boarded in a given car or attempting to board the car. This method reduces travel efficiently because it allows for one or more given shuttle cars to be overloaded and/or slows departure times, while one or more other shuttle cars remain available to provide a quicker and more convenient travel experience. Hence the challenge is to efficiently direct passengers to fill one so that it can leave immediately before directing passengers to the next.

At least one non-limiting embodiment of the invention provides a shuttle elevator system including an improved passenger boarding system. The shuttle elevator boarding system includes one or more passenger sensors that operate in conjunction with an arrival display zone. The sensor(s) detect a current number of passengers allocated to a given in real-time. Based on the allocated passengers, the arrival display zone directs one or more passengers to a particular shuttle car that will provide the most efficient travel experience (e.g., the quickest departure without being overcrowded with an excessive number of passengers).

Figure 1:
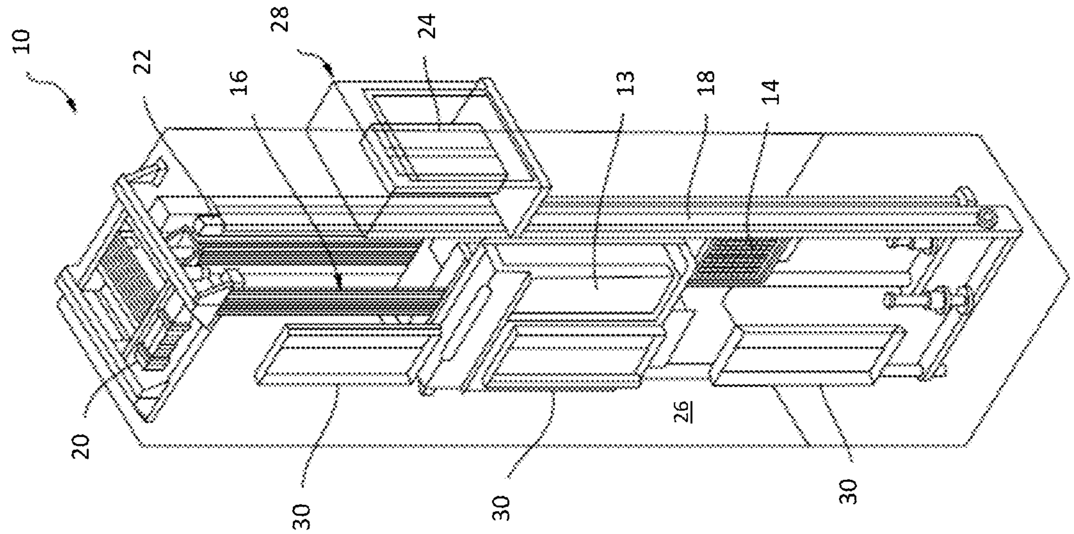
FIG. 1 depicts an elevator system that may employ various embodiments of the present disclosure.

With reference now to FIG. 1, a perspective view of a conveyance system in the form of an elevator system 10 is illustrated according to a non-limiting embodiment. The elevator system includes an elevator car 13, a counterweight 14, a tension member 16, a guide rail 18, a machine 20, a position reference system 22, and an elevator controller 24. Although the elevator car 13 is illustrated as a single-deck car, other types of elevator cars such as a double-deck car, for example, can be implemented without departing from the scope of the invention.

The elevator car 13 and counterweight 14 are connected to each other by the tension member 16. The tension member 16 may include or be configured as, for example, ropes, steel cables, and/or coated-steel belts. The counterweight 14 is configured to balance a load of the elevator car 13 and is configured to facilitate movement of the elevator car 13 concurrently and in an opposite direction with respect to the counterweight 14 within an elevator hoistway 26 and along the guide rail 18.

The tension member 16 engages the machine 20, which is part of an overhead structure of the elevator system 10. The machine 20 is configured to control movement between the elevator car 13 and the counterweight 14. The position reference system 22 may be mounted on a fixed part at the top of the elevator hoistway 26, such as on a support or guide rail, and may be configured to provide position signals related to a position of the elevator car 13 within the elevator hoistway 26. In other embodiments, the position reference system 22 may be directly mounted to a moving component of the machine 20, or may be located in other positions and/or configurations as known in the art. The position reference system 22 can be any device or mechanism for monitoring a position of an elevator car and/or counter weight, as known in the art. For example, without limitation, the position reference system 22 can be an encoder, sensor, or other system and can include velocity sensing, absolute position sensing, etc., as will be appreciated by those of skill in the art.

The elevator controller 24 is located, as shown, in a controller room 28 of the elevator hoistway 26 and is configured to control the operation of the elevator system 10, and particularly the elevator car 13. For example, the elevator controller 24 may provide drive signals to the machine 20 to control the acceleration, deceleration, leveling, stopping, etc. of the elevator car 13. The elevator controller 24 may also be configured to receive position signals from the position reference system 22 or any other desired position reference device. When moving up or down within the elevator hoistway 26 along guide rail 18, the elevator car 13 may stop at one or more landings 125 as controlled by the elevator controller 24. Although shown in a controller room 28, those of skill in the art will appreciate that the elevator controller 24 can be located and/or configured in other locations or positions within the elevator system 10. In one embodiment, the elevator controller 24 may be located remotely or in the cloud.

The machine 20 may include a motor or similar driving mechanism. In accordance with embodiments of the disclosure, the machine 20 is configured to include an electrically driven motor. The power supply for the motor may be any power source, including a power grid, which, in combination with other components, is supplied to the motor. The machine 20 may include a traction sheave that imparts force to tension member 16 to move the elevator car 13 within elevator hoistway 26.

Although shown and described with a roping system including tension member 16, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 10 and a conveyance system component such as an elevator car 13 of the elevator system 10. In another example, embodiments disclosed herein may be applicable conveyance systems such as an escalator system and a conveyance system component such as a moving stair of the escalator system.

Figure 2:
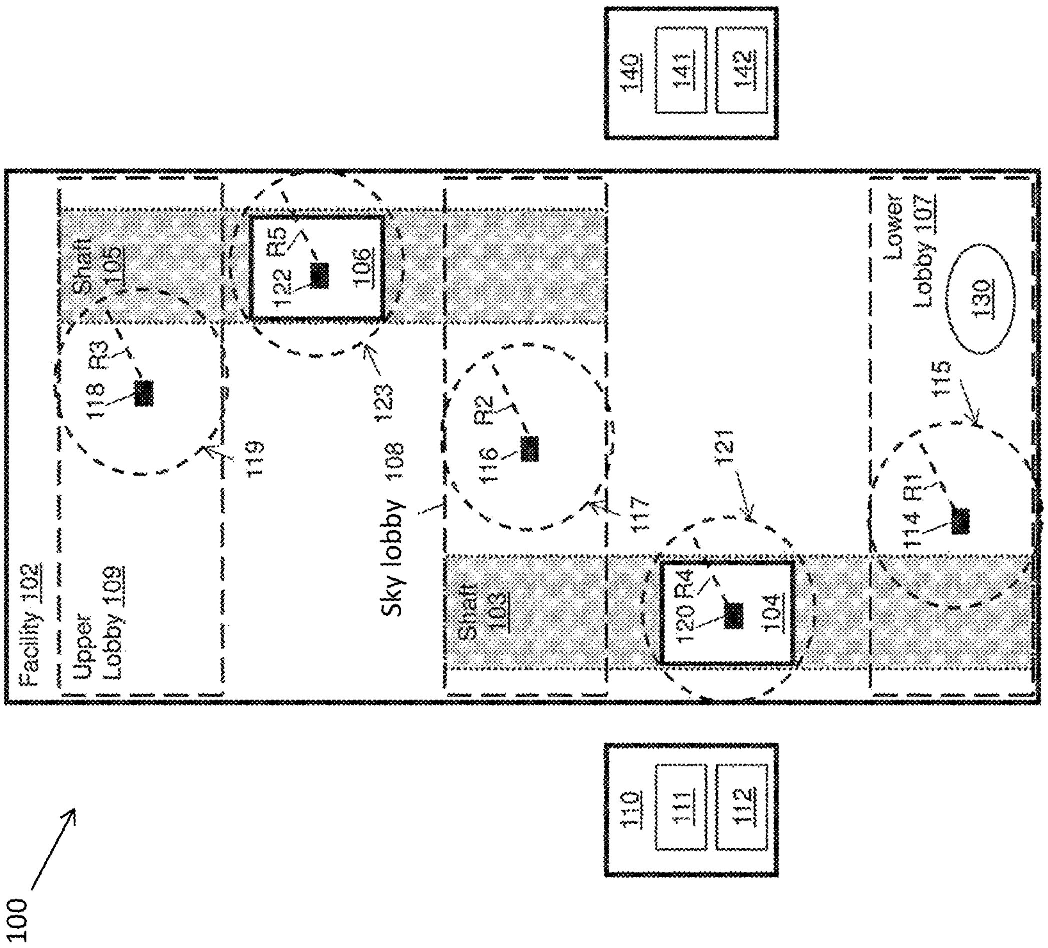
FIG. 2 depicts a building including a shuttle elevator system according to a non-limiting embodiment.

Turning to FIG. 2, a building facility 102 including a shuttle elevator system 100 is illustrated according to a non-limiting embodiment. The environment can include a facility 102 (e.g., a high rise building) comprising at least one elevator shaft supporting at least one elevator car. The facility 102 includes an elevator shaft 103 supporting an elevator car 104 and an elevator shaft 105 supporting an elevator car 106. Note that the elevator car 104 can be accessed at least at a lower lobby 107 (e.g., a ground floor of the facility 102) and a shared lobby 108 (e.g., a middle floor of the facility 102). Further, note that the elevator car 106 can be accessed at least at the shared lobby 108 and an upper lobby 109 (e.g., a top floor of the facility 102). In this regard, the shaft 103 only permits the elevator car 104 to travel between a lower floor and a middle floor (which can be considered an initial segment), and the shaft 105 only permits the elevator car 106 to travel between the middle floor and a top floor (which can be considered a subsequent segment). The arrangement of elevator shafts 103 and 105 is for exemplary purposes only and any desired arrangement and number of elevator shafts and elevator cars may be used.

The shuttle elevator system 100 comprises a computer 110. The computer 110 comprises a processor 111 and a memory 112. The memory 112 stores program instructions that are executable by the processor 111 to cause the operation described herein. The computer 110 can support and/or be a part of an elevator system that operates the elevator cars 104 and 105. The elevator system comprises one or more location devices.

In accordance with one or more embodiments, the one or more location devices can comprise at least a location device 114 with a location zone 115 (extending a radius R1), a location device 116 with a location zone 117 (extending a radius R2), a location device 118 with a location zone 119 (extending a radius R3), a location device 120 with a location zone 121 (extending a radius R4), and a location device 122 with a location zone 123 (extending a radius R5). The location device 114 can be located within and correspond thereto the lower lobby 107. The location device 116 can be located within and correspond thereto the shared lobby 108. The location device 118 can be located within and correspond thereto the upper lobby 109. The location device 130 can be located within and correspond thereto the elevator car 104. The location device 122 can be located within and correspond thereto the elevator car 106. Note that each radius of the location zone 115 can be predetermined and configured within the elevator system, such as at a distance of a width of the a lobby or an elevator car. The elevator system interacts with a mobile device (e.g., the mobile device 130) to provide a hands-free user interface for generating elevator calls.

Moreover, any location zone and location device may be placed as desired within shuttle the elevator system 100, such as in an elevator fixture. In one embodiment, the location zone may be rectangular, planar, 3-dimensional, or any other desired shape.

The elevator system 100 described herein is an example and is not intended to suggest any limitation as to the scope of use or operability of embodiments described herein (indeed additional or alternative components and/or implementations may be used). Further, while single items are illustrated for items of the elevator system 100, these representations are not intended to be limiting and thus, any item may represent a plurality of items. Embodiments of t the elevator system 100 can include configurations for a mobile device centric system (e.g., when the mobile device 130 detects trigger signals from the one or more location devices), a location device centric system (e.g., when the one or more location devices detects trigger signals from the mobile device 130), or a combination thereof. Further, embodiments of the elevator system 100 and the elevator system can include configurations for a lobby focused system, an elevator focused system, or a combination thereof.

The elevator system 100 can satisfy single-segment elevator trips and multi-segment elevator trips. In accordance with one or more embodiments, if multiple event triggers are placed on a same floor, the elevator system 100 can detect a sequence of these multiple event triggers to automatically place a single-segment trip. Further, the elevator system 100 can determine how many elevator trip segments are required for the multi-segment trip and what guidance should be provided to a user during the multi-segment trip.

The computer 110 can include any processing hardware, software, or combination of hardware and software utilized by the elevator system to carry out computer readable program instructions by performing arithmetical, logical, and/or input/output operations. The computer 110 can be implemented local to the facility 102, remote to the facility 102, or as a cloud service. The computer 110 can be representative of a plurality of computers dispersed throughout the elevator system 100. The processor 111 can comprise one or more central processing units (CPU(s)), also referred to as processing circuits, coupled via a system bus to the memory 112 and various other internal or external components (e.g., the location devices 114, 116, 118, 120, and 122). The memory 112 can include a read only memory (ROM) and a random access memory (RAM). The computer 110, by utilizing the processor 111 and the memory 112, operates to provide/support automatic calls of the elevator system for navigation in the facility 102 with respect to any elevator trip. The computer 110, by utilizing the processor 111 and the memory 112, operates to support the hands-free user interface of the mobile device 130 for navigation in the facility 102 with respect to any elevator trip. The computer 110, by utilizing the processor 111 and the memory 112, can operate to communicate with the location devices 114, 116, 118, 120, and 122. The computer 110 can also determine a status of each elevator car 104 and 106, such as which floor an elevator car is located, which direction an elevator car is traveling, a number of stops designated for an elevator trip, an elevator door position, an elevator door operation (opening vs. closing), etc. The computer 110 can operate one or more timers (e.g., movement timers and disconnect timers) with respect to the operations described herein.

The location devices 114, 116, 118, 120, and 122 can be an electro-mechanical component that generates the corresponding location zones 115, 117, 119, 121, and 123. Examples of the location devices 114, 116, 118, 120, and 122 include radio devices, such as Wi-Fi devices, Bluetooth devices, wireless beacon devices, etc. The location devices 114, 116, 118, 120, and 122 can utilize software and/or firmware to carry out operations particular thereto. In this regard, the location devices 114, 116, 118, 120, and 122 can be configured to provide triggering signals (e.g., one-way communication devices advertising a location; a radio signal being broadcast to the mobile device 130). For example, the location devices 114, 116, 118, 120, and 122 themselves can provide a triggering signal to the mobile device that causes the mobile device 130 to place an elevator call, e.g., if the mobile device receives a correct event trigger sequence, with is a set of ordered interactions between the mobile device 130 and the location devices 114, 116, 118, 120, and 122.

The location devices 114, 116, 118, 120, and 122 can include transceivers (e.g., communications and/or interface adapter) that can communicate with the computer 110 and/or the mobile device 130. The location devices 114, 116, 118, 120, and 122 may communicate with the computer 110 with wires or wirelessly. In this regard, the location devices 114, 116, 118, 120, and 122 can be configured to detect the mobile device 130 (e.g., continuously sensing the mobile device 130; the mobile device 130 altering a field of the corresponding location zone) and/or communicate with the mobile device 130 with respect to the corresponding location zones 115, 117, 119, 121, and 123. For example, the location devices 114, 116, 118, 120, and 122 themselves can automatically cause the execution of an elevator call based on one or more event trigger sequences respective to interactions with the mobile device 130. Further, the location devices 114, 116, 118, 120, and 122 can generate one or more electrical signals to the computer 110 as a function of the mobile device detection (e.g., generates an electrical signal in response to detecting a presence of the mobile device 130) and/or the mobile device communication.

The mobile device 130 can include any processing hardware, software, or combination of hardware and software utilized to carry out computer readable program instructions by performing arithmetical, logical, and/or input/output operations. The mobile device 130 can include any wireless device operated by a passenger, such as a laptop, a table computer, a mobile phone, a smartphone, a wireless beacon on the user (e.g., an electronic bracelet), radio frequency identification card, smartwatches, implants, smart glasses, wearable components, and the like. The mobile device 130 can interact/detect/communicate with the one or more location devices of the elevator system, can support/provide/execute an application and a hands-free user interface, and can connect to the computer 110 or a cloud server 140 (wirelessly through an internet, cellular, or cloud connection).

The cloud server 140, comprising a processor 141 and a memory 142 as described herein, can include any processing hardware, software, or combination of hardware and software in communication with the mobile device 130 to carry out computer readable program instructions by performing arithmetical, logical, and/or input/output operations. The cloud server 140 can be implemented local to the facility 102, remote to the facility 102, or as a cloud service to the mobile device 130. The cloud server 140, by utilizing the processor 141 and the memory 142, operates to support automatic calls executed by the mobile device 130.

In accordance with one or more embodiments, the mobile device 130 executes elevator calls in response to one or more event trigger sequences based on a logic in the application (to interpret a correct sequence). The application allows the mobile device 130 to send messages via cellular towers or other communication means (provide information over the internet to cloud-based internet servers, such as the cloud server 140). The cloud server 140 can in turn send elevator requests to the elevator controllers (e.g., the computer 110) in a specific building (e.g., the facility 102). Thus, the mobile device 130 detecting a trigger at one of the lobbies 107, 108, and 109 or within the elevator car 104 or 106 is able to send a message through a cellular network that eventually is received by the elevator system. Further, the logic in the application can store default, preset, and/or manual entries of floor destinations with respect to a user profile within the application and can cause the execution of elevator calls based on these entries as the mobile device 130 interacts with the elevator system 100. In accordance with one or more embodiments, the mobile device 130 outputs a unique signal identifying the mobile device 130 to the location devices 114, 116, 118, 120, and 122 to provide one or more event trigger sequences to the elevator system 100. An event trigger sequence is a set of ordered interactions between the mobile device and the location devices 114, 116, 118, 120, and 122. The elevator system can also operate automatic calls based on sequential detections of the mobile device 130 (e.g., an event trigger sequence). In this regard, the elevator system can execute each segment request internally, while a user is continuously notified of each elevator assignment without user confirmation (e.g., hands-free operation).

In accordance with one or more embodiments, the elevator system 100 herein can be applied to non-smartphone type systems where a passenger's identity is automatically detected via biometric scans or other means (the same resulting multi-segment trip call could be executed). For example, if a video analytics system is in-place at each floor, a process flow can be executed where if a user is detected on the lower lobby 107 and then the user is detected in elevator 104, then an elevator call for the elevator 106 is automatically placed for the user at shared lobby 108.

Figure 3:
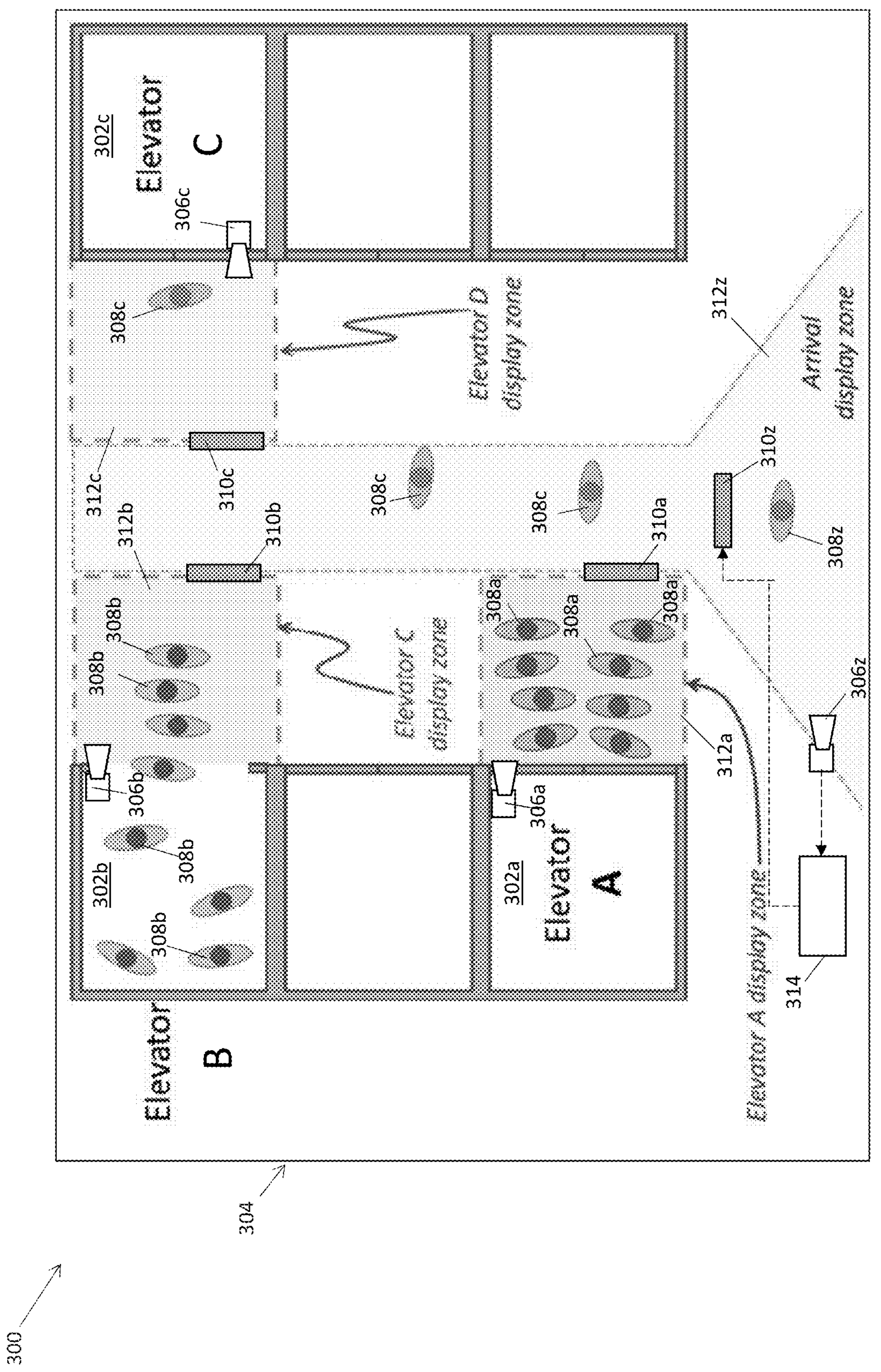
FIG. 3 is a plan view of a building lobby serviced by a shuttle elevator system that operates according to an improved passenger boarding system according to a non-limiting embodiment.

Referring now to FIG. 3, a shuttle elevator loading system 300 is illustrated according to a non-limiting embodiment. The shuttle elevator loading system 300 includes a plurality of shuttle elevators 302*a*, 302*b*, 302*c* configured to service a building lobby 304. The shuttle elevator system 300 operates differently from conventional elevator systems in that it is capable of servicing passengers without requiring call buttons or floor destination selection buttons. That is, when a shuttle elevator 302*a*, 302*b*, 302*c* is assigned a call, the doors of the called shuttle elevator are opened for a set time period and departs when the time period expires.

The shuttle elevator loading system 300 further includes one or more sensors 306*a*, 306*b*, 306*c*, 306*z* configured to detect one or more one passengers 308*a*, 308*b*, 308*c*, 308*z*, one or more display units 310*a*, 310*b*, 310*c*, 310*z* located at a display zone 312*a*, 312*b*, 312*c*, 312*z* of the lobby 304, and an elevator system controller 314. Accordingly, the shuttle elevator loading system 300 can execute a closed-loop passenger allocation process (rather than open-loop timer parameters), which actively directs and loads passengers to fill a targeted shuttle elevator before directing passengers to one or more remaining shuttle elevators that are partially filled or currently unavailable for boarding.

The sensors 306*a*, 306*b*, 306*c*, 306*z* include a lobby sensor 306*z* and elevator sensors 306*a*, 306*b*, 306*c*. The lobby sensor 306*z* can monitor the entire lobby 304 simultaneously and is configured to detect one or both of an allocated passenger 308*a*, 308*b*, 308*c* that is allocated to a shuttle elevator 302*a*, 302*b*, 302*c*, respectively, and a non-allocated passenger 308*z* that is not allocated to a shuttle elevator 302*a*, 302*b*, 302*c*. The elevator sensors 306*a*, 306*b*, 306*c* are installed at a respective shuttle elevator 302*a*, 302*b*, 302*c* (e.g., at the outside and/or inside of the elevator car) and/or at a respective elevator display zone 312*a*, 312*b*, 312*c*. Accordingly, the elevator sensors 306*a*, 306*b*, 306*c* can detect one or more allocated passengers 308*a*, 308*b*, 308*c* that are allocated to the shuttle elevator 302*a*, 302*b*, 302*c* servicing a respective elevator display zone 312*a*, 312*b*, 312*c*.

The lobby sensor 306*z* and/or the elevator sensors 306*a*, 306*b*, 306*c* can be constructed as various types of sensors or sensor systems including, but not limited to, a person recognition sensor and sensor system, or a motion detection sensor. The person recognition sensor system includes, for example, a camera and controller capable of detecting and tracking human movement and location.

The motion sensor is configured to detect motion of a passenger 308*a*, 308*b*, 308*c*, 308*z*. In one or more embodiments, the motion sensors can include an arrival motion sensor 306*z* and elevator motion sensor 306*a*, 306*b*, 306*c*. The arrival motion sensor 306 is configured to detect motion of a passenger 308*z* located at the arrival display zone 312*z*. The elevator motion sensors 306*a*, 306*b*, 306*c* are configured to detect motion of one or more passengers 308*a*, 308*b*, 308*c* located at a respective elevator display zone 312*a*, 312*b*, 312*c*.

The elevator system controller 314 is in signal communication with the sensors 306*a*, 306*b*, 306*c*, 306*z*, the display units 310*a*, 310*b*, 310*c*, 310*z* and the shuttle elevators 302*a*, 302*b*, 302*c*, while also monitoring passenger count and location in the lobby 304 and/or a given shuttle elevator 302*a*, 302*b*, 302*c*. The elevator controller 314 can be constructed as an electronic hardware controller that includes memory and a processor configured to execute algorithms and computer-readable program instructions stored in the memory. Accordingly, the elevator controller 314 can determine a number of allocated passengers 308*a*, 308*b*, 308*c*, 308*z* corresponding to each shuttle elevator 302*a*, 302*b*, 302*c*, and can generate assignment information that directs a non-allocated passenger 308*z* to an available shuttle elevator 302*c*.

The display units include an arrival display unit 310*z* and a plurality of elevator display units 310*a*, 310*b*, 310*c*. The arrival display unit 310 is located in an arrival display zone 312*z* that precedes the plurality of shuttle elevator 302*a*, 302*b*, 302*c* in order to reduce the possibility that a non-allocated passenger 308*z* will randomly choose to move toward a crowded shuttle elevator or a shuttle elevator that is not currently boarding passengers. Accordingly, once the elevator controller 314 determines which shuttle elevator is to be allocated to a given passenger, the elevator controller 314 can control the arrival display unit 310*z* to display assignment information instructing the allocated passenger to move to the corresponding shuttle elevator.

The elevator display units 310*a*, 310*b*, 310*c* are located at a respective elevator display zone 312*a*, 312*b*, 312*c*, which are located beyond the arrival display zone 312. Accordingly, the elevator display units 310*a*, 310*b*, 310*c* identify a respective shuttle elevator 302*a*, 302*b*, 302*c* such that passengers 308*a*, 308*b*, 308*c* can confirm that they are waiting at the correct zone 312*a*, 312*b*, 312*c* instructed by the arrival display unit 310*z*.

Figure 4:
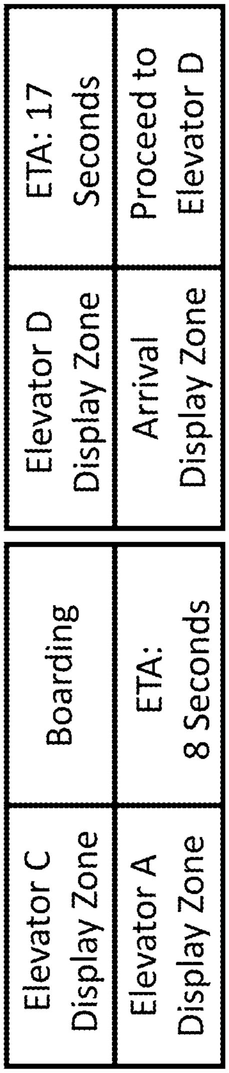
FIG. 4 depicts various dynamic displays installed at display zones of the lobby shown in FIG. 3 according to a non-limiting embodiment.

Examples of the elevator display units 310*a*, 310*b*, 310*c*, 310*z* are illustrated in FIG. 4. The arrival display unit 310 is configured to display assignment information that directs a non-allocated passenger 308*z* to an available shuttle elevator, e.g., shuttle elevator 302*c*. The display assignment information is dynamically changed as the availability and/or load of the shuttle elevators 302*a*, 302*b*, 302*c* change. The elevator display units 310*a*, 310*b*, 310*c* are configured to display boarding information of the shuttle elevators 302*a*, 302*b*, 302*c* corresponding to their respective display zones 312*a*, 312*b*, 312*c*. The boarding information includes, but is not limited to, an on-going boarding event, and an estimated time at which a boarding event will occur.

The elevator controller 314 directs passengers 308*a*, 308*b*, 308*c*, 308*z* to queue at the first available car until the sensors 306*a*, 306*b*, 306*c*, 306*z* indicate a given shuttle elevator 302*a*, 302*b*, 302*c* is fully allocated (e.g., currently on-board or waiting to board). The elevator controller 314 then directs passengers to the next available second shuttle elevator. Therefore, the elevator controller 314 can execute a closed-loop passenger allocation process (rather than open-loop timer parameters), which actively directs and loads passengers to fill a targeted shuttle elevator before directing passengers to one or more remaining shuttle elevators that are partially filled or currently unavailable for boarding The elevator controller 314 can dynamically allocate passengers to a given shuttle elevator 302*a*, 302*b*, 302*c* based on the detection and monitoring performed by the sensors 306*a*, 306*b*, 306*c*, 306*z*, along with a preset passenger threshold assigned to the shuttle elevators 302*a*, 302*b*, 302*c*. For example, the elevator controller 314 can constantly track passenger allocations corresponding to each shuttle elevator 302*a*, 302*b*, 302*c*. Passenger allocations can include the initial allocations determined by the elevator controller 314 at the initial time at which a passenger enters the arrival display zone 312*z* and/or the actual location of a passenger determined by the sensors 306*a*, 306*b*, 306*c*, 306*z*. Accordingly, the elevator controller 314 can compare the number of passengers allocated to a given shuttle elevator 302*a*, 302*b*, 302*c* to the passenger threshold. When the number of allocated passengers exceeds the passenger threshold, the elevator controller 314 can determine the corresponding shuttle elevator is full. Accordingly, the elevator controller stops allocating passengers to the full shuttle elevator and then begins allocating passengers to another available shuttle elevator that has not reached its passenger threshold.

In one or more embodiments, the elevator controller 314 can actively modify a passenger allocation of a corresponding shuttle elevator 302*a*, 302*b*, 302*c*. When implementing the lobby sensor 306*z* as a person recognition sensor system, for example, the elevator controller 314 can track a location of one or more allocated passengers within the lobby 304. When an allocated passenger correctly moves to their directed shuttle elevator 302*a*, 302*b*, 302*c*, the elevator controller 314 can maintain their original allocation until the allocated passenger boards the corresponding shuttle elevator 302*a*, 302*b*, 302*c* and departs the lobby 304. When, however, an allocated passenger moves to a shuttle elevator 302*a*, 302*b*, 302*c* that is different from the originally allocated shuttle elevator 302*a*, 302*b*, 302*c*, the elevator controller 314 can remove the passenger allocation from the original originally allocated shuttle elevator 302*a*, 302*b*, 302*c*, and add a new passenger allocation to the shuttle elevator 302*a*, 302*b*, 302*c* chosen by the passenger.

Similarly, the elevator controller 314 can actively modify a passenger allocation of a corresponding shuttle elevator 302*a*, 302*b*, 302*c* when implementing motion detector sensors as the lobby sensor 306*z* and elevator sensors 306*a*, 306*b*, 306*c*. For example, the lobby sensor 306*z* can detect motion of a non-allocated passenger 308*z* located in the arrival display zone 312*z*, which in turn initiates the allocation process for allocating the passenger 308*z* to a shuttle elevator 302*a*, 302*b*, 302*c*. Once determining a targeted shuttle elevator (e.g., a non-crowded shuttle elevator 302*c*), the elevator controller 314 outputs assignment information, which is displayed on the arrival zone display unit 310*z* and instructs the passenger 308*z* to targeted shuttle elevator 302*c*. Accordingly, the previously non-allocated passenger (e.g., passenger 308*z*) is now deemed to be allocated to the targeted shuttle elevator (e.g., shuttle elevator 302*c*).

In one or more embodiments, once the passenger 308*c* is allocated, the elevator controller initiates a timer and initiates the time value to a time threshold. In the meanwhile, the elevator sensor 306*c* corresponding to the targeted shuttle elevator 302*c* continuously detects passengers entering and/or exiting the corresponding elevator display zone 312*c*, and outputs the detection to the elevator controller 314. When the elevator controller 314 determines that the elevator sensor 306*c* detects a passenger entering the corresponding elevator display zone 312*c* within the time threshold, the elevator controller determines that the most recent allocated passenger 308*c* has successfully reached the instructed target shuttle elevator 302*c* and maintains the allocation.

When, however, the elevator controller 314 determines that the elevator sensor 306*c* has not detected a passenger entering the corresponding elevator display zone 312*c* within the time threshold (i.e., the timer value exceeds the time threshold), the elevator controller determines that the most recent allocated passenger 308*c* has not moved to the instructed target shuttle elevator 302*c* and removes this most recent allocation corresponding to the target elevator 302*z*. This scenario may occur when, for example, the allocated passenger 308*z* disregards the assignment information displayed on the arrival zone display unit 310*z* and instead moves to a different shuttle elevator or abandons the elevator trip all together (e.g., leaves the building). Accordingly, the allocation and load of the shuttle elevators can be dynamically adjusted based on the actions of the passengers.

The elevator controller 314 can also revise allocations shuttle elevators 302*a*, 302*b*, 302*c* that may result from passengers deciding to move to shuttle elevators to which they were initially assigned. For instance, the elevator controller 314 may receive an output from elevator sensor 306*b* indicating a passenger 308*b* has unexpectedly entered its elevator display zone 312*b*. This scenario may occur, for example, when a passenger was previously assigned to a targeted shuttle elevator (e.g., shuttle elevator 302*c*) decides to either move directly to shuttle elevator 302*b* or leave the assigned elevator display zone 312*c* and enter elevator display zone 312*b*. In either case, the elevator controller 314 can dynamically add a new allocation to elevator display zone 312*b*.

In one or more non-limiting embodiments, the elevator controller 314 can also control operation of the shuttle elevators 302*a*, 302*b*, 302*c* to discourage or reduce elevator overcrowding or inefficient ride operation. For example, a turnstile (not shown) may be installed ahead of the shuttle elevator doors, and can be in signal communication with the elevator controller 314. The turnstile outputs a count value as passengers pass through the turnstile gate. The elevator controller 314 compares the turnstile count to a passenger allocation threshold assigned to the shuttle elevators 302*a*, 302*b*, 302*c*. When the turnstile count equals the passenger allocation threshold, the elevator controller 314 can output a turnstile control signal that locks the turnstile gate. Accordingly, passengers that were not allocated to the shuttle elevator may be prevented from overcrowding the elevator. Once the shuttle elevator departs, the elevator controller 314 can output control signal that unlocks the turnstile gate and allows a new group of allocated passengers to board the shuttle elevator once it becomes available.

In another example, the elevator controller 314 is preprogrammed with times at which the shuttle elevators 302*a*, 302*b*, 302*c* should depart the lobby 304. The times can be dynamically adjusted based on the passenger traffic within the lobby 304 or predicted traffic within the lobby 304 based on traffic history. For example, the elevator controller 314 is capable of executing a passenger traffic learning algorithm to control passenger boarding of a one or more shuttle elevators 302*a*, 302*b*, 302*c* and/or to shut down shuttle elevators that are not needed during times of light traffic.

As described herein, various non-limiting embodiments provide a shuttle elevator system including an improved passenger boarding system. The shuttle elevator boarding system includes one or more passenger sensors that operate in conjunction with an arrival display zone. The sensor(s) detect a current number of passengers allocated to a given in real-time. Based on the allocated passengers, the arrival display zone directs one or more passengers to a particular shuttle car that will provide the most efficient travel experience (e.g., the quickest departure without being overcrowded with an excessive number of passengers).

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, embodiments can be in the form of processor-implemented processes and devices for practicing those processes. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A shuttle elevator loading system comprising:

a plurality of shuttle elevators configured to service a building lobby;

at least one sensor configured to detect at least one passenger;

at least one display unit located at a display zone of the lobby; and an elevator system controller in signal communication with the at least one sensor and the at least one display unit, the elevator system controller configured to identify a given passenger detected by the at least one sensor as either an allocated passenger that is allocated to one of the plurality of shuttle elevator or a non-allocated passenger that is not allocated to one of the plurality of shuttle elevators, and is configured to determine a number of allocated passengers corresponding to each shuttle elevator, and to generate assignment information that directs a non-allocated passenger to an available shuttle elevator such that that the previously non-allocated passenger is determined as a newly identified allocated passenger, wherein the controller adds a first passenger allocation to the available elevator after generating the assignment information, and dynamically removes the first passenger allocation from the available shuttle elevator and adds a second passenger allocation to a second available shuttle elevator in response to detecting that the newly identified allocated passenger moves from the available shuttle elevator to the second available shuttle elevator.

2. The elevator system of claim 1, wherein the elevator system controller dynamically controls the at least one display unit based on the assignment information.

3. The shuttle elevator loading system of claim 1, wherein the elevator controller controls the elevator shuttle loading system to reduce passenger crowding based on the number of allocated passengers corresponding to at least one of the shuttle elevators.

4. The shuttle elevator loading system of claim 1, wherein the at least one display unit includes an arrival display unit located in an arrival display zone that precedes the plurality of shuttle elevators.

5. The shuttle elevator loading system of claim 4, wherein the elevator system controller controls the arrival display unit to display the assignment information that directs a non-allocated passenger to an available shuttle elevator.

6. The shuttle elevator loading system of claim 5, wherein the displayed assignment information is dynamically changed as an availability of the shuttle elevators changes.

7. The shuttle elevator loading system of claim 1, wherein the elevator system controller dynamically adjusts the number of allocated passengers corresponding to at least one shuttle elevator based at least in part on an output of the at least one sensor following an initial allocation assigned to the at least one passenger.

8. The shuttle elevator loading system of claim 1, wherein the elevator system controller is configured to control boarding of the at least one passenger based on a number of allocated passenger corresponding to a given shuttle elevator.

9. A method of controlling a shuttle elevator loading system, the method comprising:

a plurality of shuttle elevators configured to service a building lobby;

detecting, via at least one sensor, at least one passenger of at least one shuttle elevator among a plurality of shuttle elevators servicing a building lobby;

at least one display unit located at a display zone of the lobby; and determining, via an elevator system controller, a number of allocated passengers corresponding to each shuttle elevator; and generating assignment information that directs a non-allocated passenger among the at least one passenger to an available shuttle elevator to transition the non-allocated passenger to a newly identified allocated passenger and adding a first passenger allocation to the available elevator after generating the assignment information;

detecting that the newly identified allocated passenger moves from the available shuttle elevator to a second available shuttle elevator different from the first available shuttle elevator; and dynamically removing the first passenger allocation from the available shuttle elevator and adding a second passenger allocation to a second available shuttle elevator in response to detecting that the newly identified allocated passenger moves from the available shuttle elevator to the second available shuttle elevator.

10. The method of claim 9, further comprising dynamically controlling the at least one display unit based on the assignment information.

11. The method of claim 9, further comprising controlling the elevator shuttle loading system to reduce passenger crowding based on the number of allocated passengers corresponding to at least one of the shuttle elevators.

12. The method of claim 9, further comprising displaying the assignment information on an arrival display unit that is located at an arrival display zone that precedes the plurality of shuttle elevators.

13. The method of claim 12, further comprising controlling the arrival display unit to display the assignment information that directs a non-allocated passenger to an available shuttle elevator.

14. The method of claim 13, further comprising dynamically changing the assignment information as an availability of the shuttle elevators changes.

15. The method of claim 9, further comprising dynamically adjusting the number of allocated passengers corresponding to at least one shuttle elevator based at least in part on an output of the at least one sensor following an initial allocation assigned to the at least one passenger.

16. The method of claim 9, further comprising controlling boarding of the at least one passenger based on a number of allocated passenger corresponding to a given shuttle elevator.

* * * * *